United States Patent [19]

Hinchcliffe et al.

[11] 4,035,038
[45] July 12, 1977

[54] CONTROLLED DEFLECTION ROLL ASSEMBLY

[75] Inventors: John Crossley Hinchcliffe, Cheshire; Peter Hold, Milford, both of Conn.

[73] Assignee: USM Corporation, Boston, Mass.

[21] Appl. No.: 658,619

[22] Filed: Feb. 17, 1976

[51] Int. Cl.² .................................... F16C 7/04
[52] U.S. Cl. .............................. 308/9; 29/116 R; 308/122
[58] Field of Search .............. 308/9, 26, 107, 72, 308/73; 29/116 R, 116 AD, 113 R, 113 AD

[56] References Cited

U.S. PATENT DOCUMENTS

| | | | |
|---|---|---|---|
| 3,587,152 | 6/1971 | Hold | 29/116 AD |
| 3,711,169 | 1/1973 | Gardner | 308/73 |
| 3,926,482 | 12/1975 | Schuller et al. | 308/72 X |
| 3,932,921 | 1/1976 | Biondetti | 29/116 AD |
| 3,949,455 | 4/1976 | Biondetti | 29/116 AD |

*Primary Examiner*—Joseph F. Peters, Jr.
*Assistant Examiner*—Gene A. Church
*Attorney, Agent, or Firm*—Donald N. Halgren; Vincent A. White; Richard B. Megley

[57] ABSTRACT

A radially directed pressure applying member is disposed between a nonrotative inner shaft and a rotative outer shell encircling the nonrotative inner shaft, which comprises a controlled deflection roll assembly. The pressure applying member includes a fluid filled toroidal shaped flexible membrane disposed on the outer end of a hydrostatic piston arranged radially within the nonrotative shaft. The toroidal shaped membrane acts as a bearing and a fluid cushion on the inner surface of the outer shell to uniformly support the shell and to avoid deflections caused by external loads or to deflect the shell in a predetermined way.

8 Claims, 5 Drawing Figures

CONTROLLED DEFLECTION ROLL ASSEMBLY

BACKGROUND OF THE INVENTION

1. Field of the Invention

This invention relates to rolling machines and more particularly to controlled deflection rolls comprising an inner nonrotative shaft having a roll shell journaled about it, the inner shaft having hydrostatic bearings directed against the inner surface of the roll shell.

2. Description of the Prior Art

This invention is generally related to a co-pending U.S. application Ser. No. 583,860, filed June 4, 1975 now abandoned, and assigned to the assignee of the present invention. That invention includes an arrangement to externally bend the inner nonrotating shaft of the deflection roll, wherein deflection sensors control the amount of bending, the inner shaft bending in a manner to counter any deflection incurred in the roll shell.

An earlier invention assigned to the present assignee is U.S. Pat. No. 3,587,152, which involves a controlled deflection roll having one or more radially acting pressure applying pistons. Each piston has a hydrostatic bearing pad on its radially outer end. The bearing pad has a curvilinear surface that supports the inner surface of the roll shell with pressurized fluid providing a lubricant therebetween.

A fluid bearing table roll is described in U.S. Pat. No. 3,869,774 wherein an elastomeric ring is disposed radially outwardly of an annular bearing ring member. U.S. Pat. No. 3,846,883, discloses a piston and shoe arrangement for deflection rolls. The shoe is pivotally mounted in the piston and is in slidable relation with a rotatable shell.

Another recent patent, U.S. Pat. No. 3,879,827, discloses a roll for a rolling mill wherein isolated arrays of hydrostatic bearings may have a larger bearing force at the middle of the roll shell. A further example of the prior art is shown in U.S. Pat. No. 3,802,044 wherein a piston has a hydrostatic bearing interface with a shell roll, the bearing being tiltable and fed with pressurized fluid from a servomotor, the piston being floatable within the nonrotative shaft. Foreign prior art includes British Pat. No. 641,466 and Canadian Pat. No. 976,031 which disclose pressure roller arrangements.

It is seen, therefore, that the prior art encompasses a number of approaches to the problem of providing bearing support for a roll shell. Much of the prior art is comprised of unduly complicated geometry of their pistons and has the potential disadvantage of being unstable during operating conditions, particularly if large deflections of the roll shell are encountered. None of the art teaches the concept of pressurized resilient toroidally shaped bearing pads in conjunction with a pressurizable fluid bearing lubricant.

BRIEF SUMMARY OF THE INVENTION

According to the present invention, a roll shell is journaled about a nonrotative shaft. The shaft contains an arrangement of pistons, the outer end of each comprising a hydrostatic bearing pad which supports the roll shell internally. Each hydrostatic bearing pad is comprised of a toroidally shaped member that is flexible and resilient. Each piston has a channel through which pressurizable fluid, usually oil, may pass into the body of the toroidal member and into the space between the toroid and the inner surface of the roll shell. A pressure drop of the fluid across the piston permits axial adjustment with respect to the piston and the roll shell. The pressurized fluid keeps the toroidal member inflated, and the fluid keeps the area of contact between the toroidal member and the inner surface of the roll shell well lubricated. The pressure drop and axial adjustment of the piston are self-correcting according to the load thereon.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENTS

Figure 1:
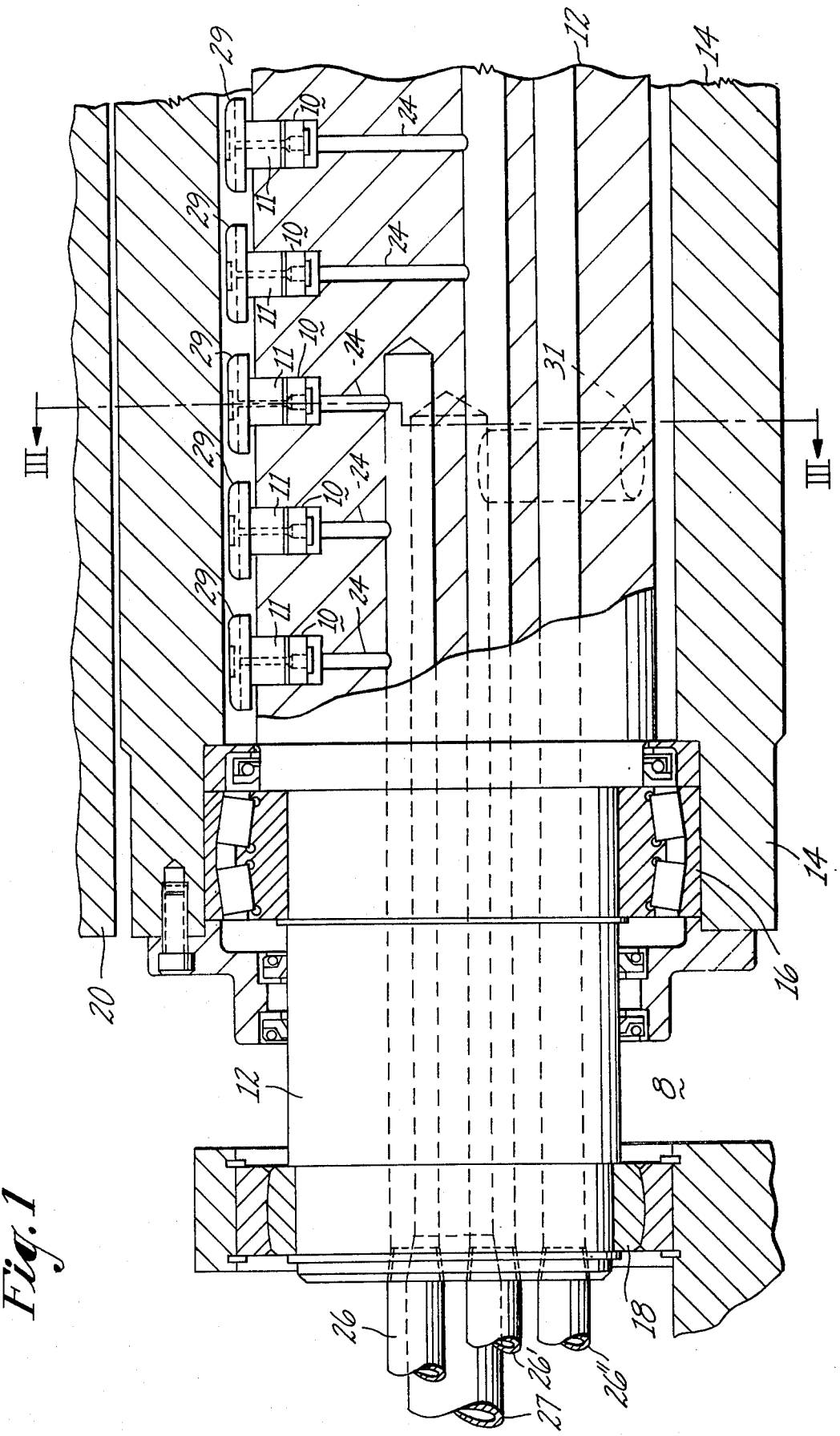
FIG. 1 is a longitudinal sectional view of a roll shell utilizing the hydrostatic pistons of this invention.

Referring to the drawings in detail, and particularly to FIG. 1, there is shown a controlled deflection roll 8 comprising a plurality of hydrostatic piston assemblies 10 comprised of a piston 11 and a bearing membrane 29, arranged along the generally upwardly directed edge of a stationary, nonrotative support shaft 12. A cylindrically shaped roll shell 14 is journaled about the support shaft 12. The roll shell 14 has support bearings 16 at each end. The support shaft 12 is held by support shaft bearings 18 at its ends, as shown in FIG. 1. Each hydrostatic piston assembly 10 supports a portion of the roll shell 14 in the area between its support bearings 16. The roll shell 14 requires support against deflection across its length, because of its own weight, because of its load and it may be supporting the pressure of a second roll 20 against it, because a predetermined deflection is desired, or a combination of the above.

Figure 2:
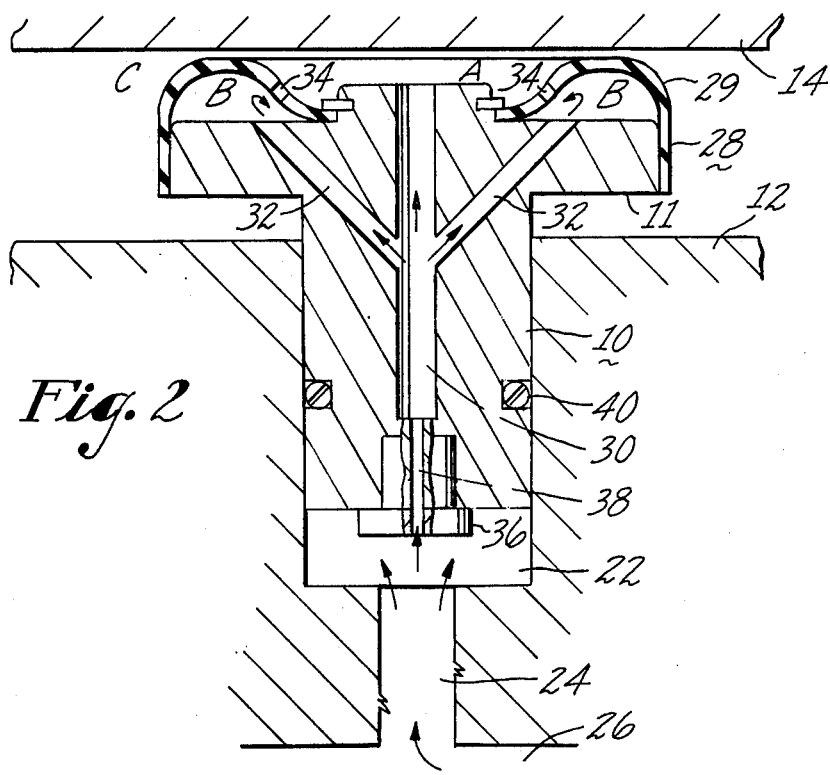
FIG. 2 is a cross-sectional view of a hydrostatic piston bearing constructed according to the principles of this invention.

Each hydrostatic piston assembly 10, shown more clearly in FIG. 2, may utilize different pressures to perform its function. The differing pressures may arise from any of several pressure supply channels 26, 26', 26'', as shown in FIG. 1, or control of pressure separately in each piston assembly 10. The hydrostatic piston assembly 10 is slidingly mated to a generally radially directed, upwardly oriented orifice 22 in the nonrotative shaft 12. The radially inner end of each piston orifice 22 has a fluid supply conduit 24 that connects the orifice 22 to one of the pressurized fluid supply channels 26. Each hydrostatic piston assembly 10 has a closed center torus bearing pad 28 on its outer end. The bearing pad includes a membrane 29 which may be comprised of a resilient, flexible material such as an elastomeric substance, i.e., rubber or urethane, or, alternatively, a thin metal. A generally centrally located channel 30 extends through each piston 11 to permit fluid communication from the fluid supply conduit 24 to an outside area A of the bearing pad 28, or to an area B within the bearing pad 28 via an array of branch channels 32. Each bearing membrane 29 in this embodiment has a plurality of fluid passageways 34 disposed near its inner periphery.

Figure 3:
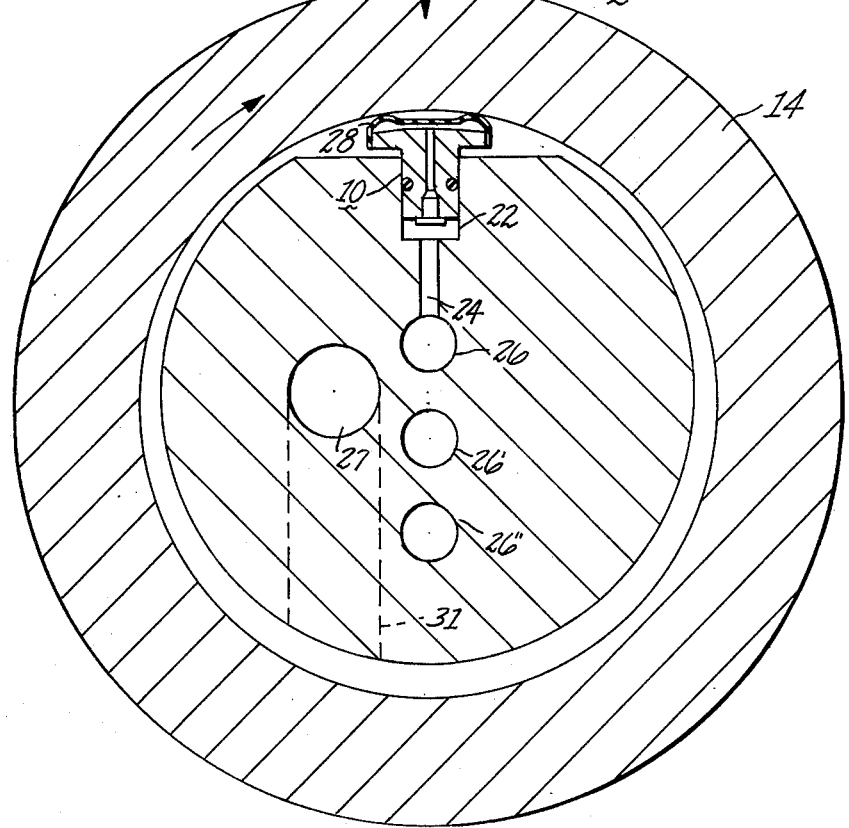
FIG. 3 is a sectional view taken along the lines III—III of FIG. 1.

As the roll shell 14 revolves about the nonrotating shaft 12 and as it is loaded by the second roll 20, as shown in FIG. 3, a pressure nip is created due to forces on a workpiece 23 and the rolls therebetween. The roll shell 14 is thereby subject to deflection. However, fluid under pressure is forced through the fluid supply channel 26 and into the fluid supply conduit 24. This places a force on the inner end of the hydrostatic piston assembly 10, displacing it axially, that is, radially outwardly from the shaft 12. Some of the pressurized fluid, however, is permitted to pass through a restrictor arrangement 36 which may be comprised of a capillary 38. This pressurized fluid, usually oil, then passes into the area A immediately outwardly of the bearing pad 28. Some of the pressurized fluid also passes into the branch channels 32 which feed the pressurized fluid into area B which is the toroidally enclosed volume. As the load on the roll shell 14 varies, the axial displacement and resultant change in fluid pressure in the hydrostatic piston assembly 10 varies. The resilient toroid material, acting similar to an "air bag", has its pressure maintained therein by a fluid pressure source, not shown, preventing the roll shell 14 from deflecting. The pressurized fluid within the area A acts as a lubricant, because some escapes to an area C outside the toroidal area, thus keeping the membrane 29 and the inner surface of the roll shell 14 lubricated.

At least one O-ring 40 is disposed about the body of each hydrostatic piston to prevent leakage of pressurized fluid between the orifice 22 and the piston 11.

The relationship of the hydrostatic piston assembly 10 and the roll shell 14 and its additional load creating second roll 20 is shown more clearly in FIG. 3 in a transverse view. The pressurized fluid channels 26, 26', and 26" are shown with their respective fluid supply conduits 24 for each hydrostatic piston assembly 10. Also shown in FIG. 3 is a hydraulic return line 27 having a fluid pickup channel 31 which draws used fluid from the lower section of the roll shell 14 and returns it for recycling through the system. The nonrotative shaft 12 is shown to be slightly non-circular in this section. The nonrotative shaft 12 may have any cross section provided there is a proper mating and interrelationship between the shaft 12 and the roll shell 14.

Figure 4:
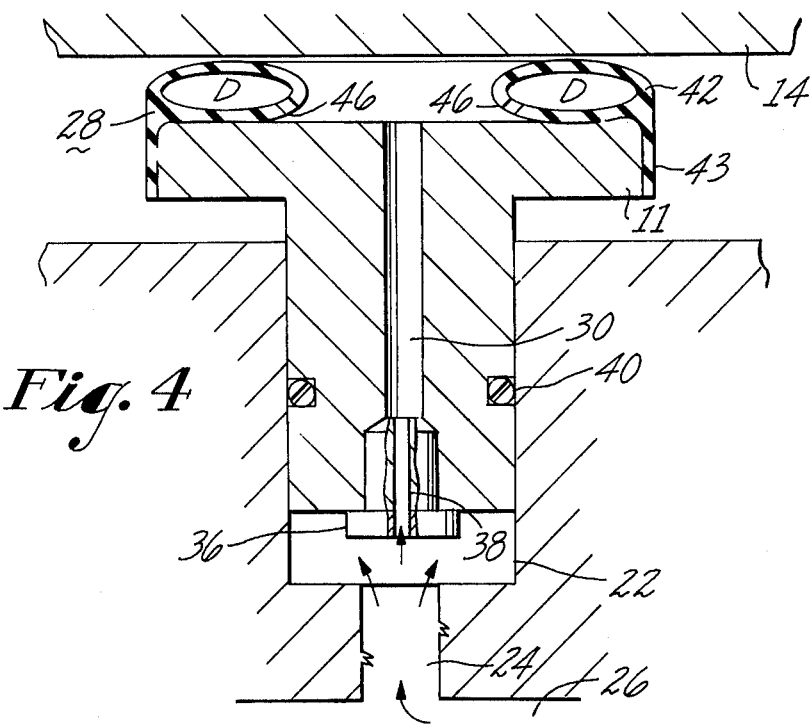
FIG. 4 is a cross-sectional view of an alternative embodiment of the hydrostatic piston bearing.

An alternative embodiment of the toroidal bearing pad member 28 is shown in FIG. 4 wherein a closed, flanged torus 42 comprises the bearing pad 28 disposed on the outer end of the hydrostatic piston assembly 10. The closed torus 42 has a flange 43 that prevents movement of the torus 42 from the piston 11. The pressurized fluid keeps the closed flange torus 42 inflated and lubricated with respect to the load, that is, the roll shell 14. The closed flange torus 42 has a plurality of fluid orifices 46 wherein pressurized fluid may enter or through which pressurized fluid may leave the volume D. The hydrostatic piston assembly 10 reacts accordingly with axial displacement per any pressure changes or load variations, as it did on the previous embodiment.

Figure 5:
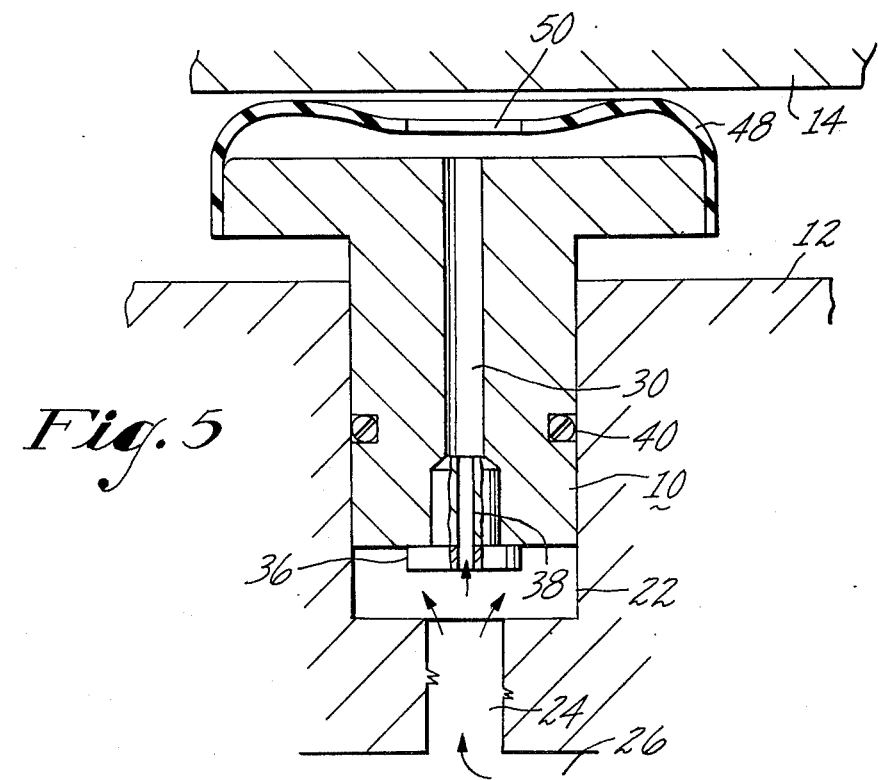
FIG. 5 is yet another alternative embodiment of the hydrostatic piston bearing in a cross-sectional view.

A still further embodiment of the toroidal bearing pad member 28 is shown in FIG. 5 wherein an open center, generally hemispherically shaped, torus 48 comprises the bearing pad 28 disposed on the outer end of the piston 11. The open center torus 48 has an opening 50 at its center for passage of pressurized fluid for lubrication. The open center torus 48 is circumferentially attached around its inwardly directed side against the piston 11 thereof to insure an immovable relationship with respect to the outer end of the piston 11.

The bearing pad 28 area of each hydrostatic piston assembly 10 is greater than the area of the inner end of the piston 11 which applies the roll deflection controlling pressure. The bearing pad 28 is supplied with the fluid, usually oil, at a fluid pressure substantially equal to the pressure applied to the inner end of the piston 11 but which flows through the flow restrictor 36. The flow-through of fluid is required for operation of a hydrostatic bearing. The inside surface of the roll shell 14 forms the bearing runner.

The pressurized fluid applied to each hydrostatic bearing assembly 10 does not force the bearing pad 28 into direct contact with the inside of the roll shell 14. Fluid pressure on the inner end of each hydrostatic piston assembly 10 forces the piston 11 radially outwardly from its orifice 22 within the shaft 12 toward the inside of the roll shell 14, and also causing the pressurized fluid to flow through the restrictor 36 and into the channel 30 then to the bearing pad 28 which has a larger piston surface area than the inner end of the piston 11. The fluid escapes from the pressurizable toroidal bearing pad 28 at a rate dependent on the pressure the hydrostatic piston assembly 10 applies to the toroidal bearing pad 28. If the pressure upon the hydrostatic piston assembly 10 increases, the bearing pad 28 moves closer to the inside of the roll shell 14, and becomes flatter, slowing down any escape of pressurized fluid therefrom, so that the pressure within each toroidal bearing pad 28 builds up and keeps the bearing pad 28 separated from the inside of the roll shell 14, the opposite occurring with a decrease in pressure upon the hydrostatic piston assembly 10. This response is automatic and independent of the roll shell's 14 rotative speed. This response is also independent of non-perpendicular operating conditions, that is, when the roll shell 14 deflects so much that its centroidal axis is oblique with respect to the longitudinal axis of the hydrostatic piston assembly 10. A nonuniform gap would therefore exist between the toroidal bearing pad 28 and the inner wall of the roll shell 14, resulting in a temporary nonuniform pressure distribution. The flow of pressurized fluid in area with larger gaps will be greater than those areas having smaller gaps between the toroidal bearing pad 28 and the roll shell 14. The pressure distribution around the periphery of the toroidal bearing pad 28 in the area where it is close to the surface of the roll shell 14 will, therefore, be nonuniform. This will result in a deformation in the toroidal bearing pad 28 because the pressure on the inside of the torus is held constant. The torus, or toroidal bearing pad 28, has a tendency to compensate for any nonuniform gap distribution around its periphery which, therefore, permits consistent support of the roll shell 14.

Thus, it has been shown that the present invention defines a hydrostatic bearing comprising a useful and novel toroidally shaped pad that permits deflection of its supported member stable beyond ranges found in the art.

Though the invention has been described with a certain degree of particularity, it is intended that the appended claims are exemplary only and are not to be interpreted in a limiting sense.

We claim:

1. A controlled deflection roll comprising:

a nonrotative shaft having a support arrangement near the ends thereof;

a shell roll journalled about said shaft, said shell roll and said shaft having a radial space therebetween;

at least one reciprocally mounted pressure-responsive piston disposed in a cavity which is radially inwardly disposed in said shaft;

a hydrostatic bearing pad disposed on the radially outer end of said piston;

a pressurized fluid supply arrangement within said shaft;

said hydrostatic bearing pad being comprised of a generally toroidal shape, and is made of a generally resilient, thin walled material to permit said hydrostatic bearing pad to flex under varying loads and angles of operaton.

2. A controlled deflection roll as recited in claim 1, wherein said piston has a generally centrally directed channel extending therethrough to permit fluid communication between said pressurized fluid supply arrangement in said shaft and said bearing pad; and said bearing pad having at least one orifice therethrough to permit fluid communication from within said bearing pad to the inner surface of said shell roll.

3. A controlled deflection roll as recited in claim 2 wherein said channel through said piston includes a restrictor to permit a regulatable pressure drop thereacross.

4. A controlled deflection roll as recited in claim 2 wherein said piston has branch channels therein which permit pressurized fluid to pass from said generally centralized channel to the area between said bearing pad and the radially outer end of said piston to maintain the inflatability of said bearing pad.

5. A controlled deflection roll as recited in claim 2 wherein a plurality of pistons is disposed within said shaft.

6. A controlled deflection roll as recited in claim 5 wherein said pressurized fluid supply arrangement within said shaft comprises several conduits, each having its own fluid under certain pressure, each of said conduits feeding a portion of said plurality of said pistons disposed within said shaft, thusly permitting various pressures in the various pistons.

7. A controlled deflection roll as recited in claim 5 wherein said hydrostatic bearing pad is comprised of a generally toroidally shaped membrane.

8. A controlled deflection roll as recited in claim 5 wherein said hydrostatic bearing pad is comprised of a generally hemispherically shaped membrane.

* * * * *